No. 610,468. Patented Sept. 6, 1898.
J. BLAIS.
VEHICLE WHEEL.
(Application filed Sept. 15, 1897.)
(No Model.) 3 Sheets—Sheet 1.
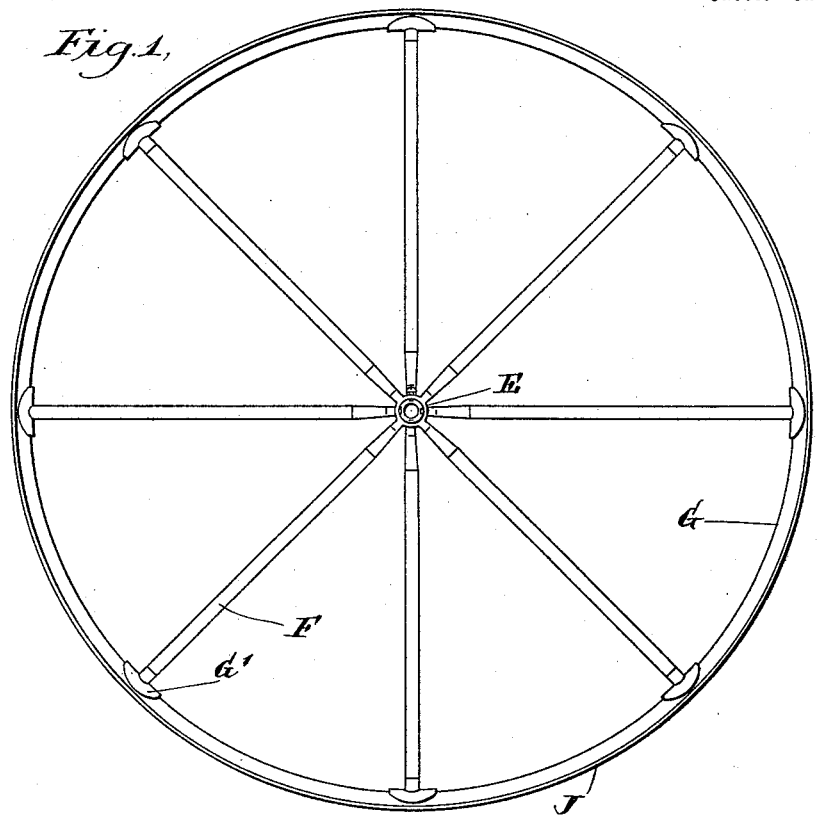
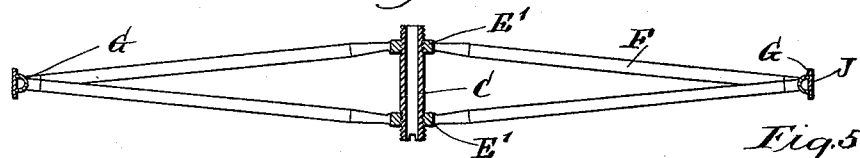
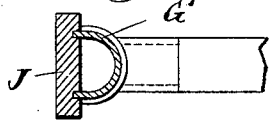
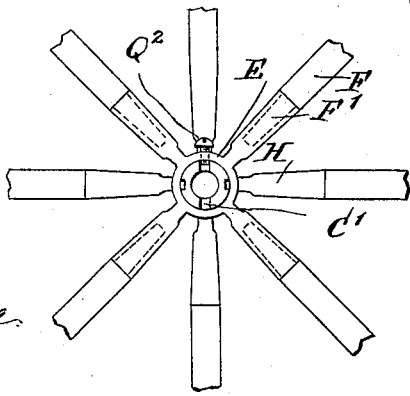
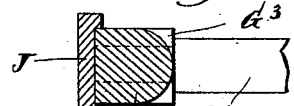
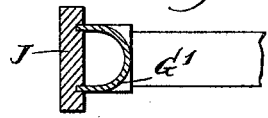
WITNESSES: Edward Thorpe, John Lotka
INVENTOR J Blais
BY [signature]
ATTORNEYS.

No. 610,468. Patented Sept. 6, 1898.
J. BLAIS.
VEHICLE WHEEL.
(Application filed Sept. 15, 1897.)
(No Model.) 3 Sheets—Sheet 2.

WITNESSES:
Edward Thorpe
John Lotka

INVENTOR
J. Blais
BY
ATTORNEYS.

No. 610,468. Patented Sept. 6, 1898.
J. BLAIS.
VEHICLE WHEEL.
(Application filed Sept. 15, 1897.)

(No Model.) 3 Sheets—Sheet 3.

WITNESSES:
Edward Thorpe
John Lotka

INVENTOR
J. Blais
BY
Munn
ATTORNEYS.

UNITED STATES PATENT OFFICE.

JOSEPH BLAIS, OF SHERBROOKE, CANADA.

VEHICLE-WHEEL.

SPECIFICATION forming part of Letters Patent No. 610,468, dated September 6, 1898.

Application filed September 15, 1897. Serial No. 651,746. (No model.)

*To all whom it may concern:*

Be it known that I, JOSEPH BLAIS, of Sherbrooke, in the Province of Quebec and Dominion of Canada, have invented a new and Improved Vehicle-Wheel, of which the following is a full, clear, and exact description.

My invention relates to vehicle-wheels, and has for its object to provide an improved means for tightening the tires on the rims of such wheels. For this purpose I employ a wheel with a double set of converging spokes, and I provide a novel mechanism for moving the inner ends of the spokes toward or from each other, thereby increasing the diameter of the wheel at the rim, all as hereinafter described. I also provide a novel connection for the ends of the rim.

The features of novelty will be pointed out in the appended claims.

Reference is to be had to the accompanying drawings, forming a part of this specification, in which similar characters of reference indicate corresponding parts in all the views.

Figure 7:
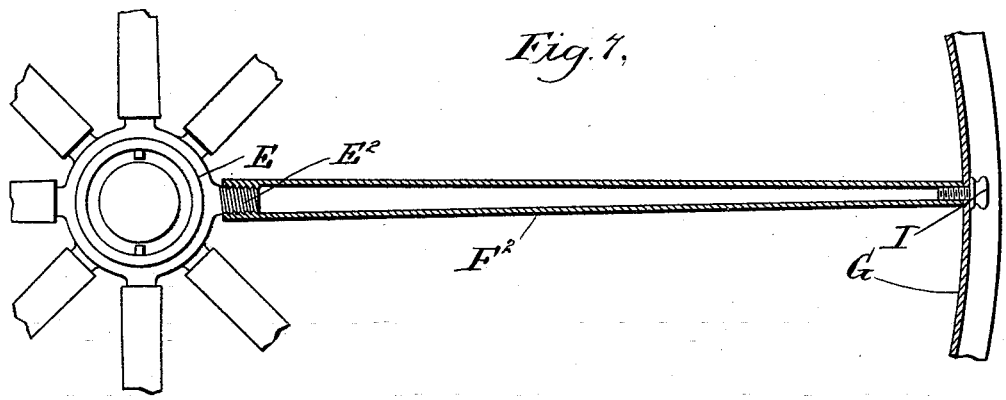
Figure 8:
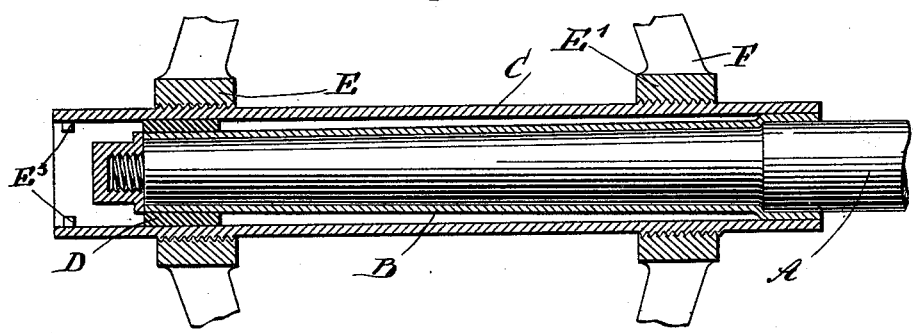
Figure 9:
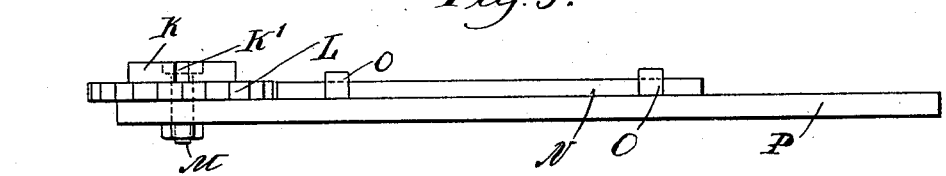
Figure 10:
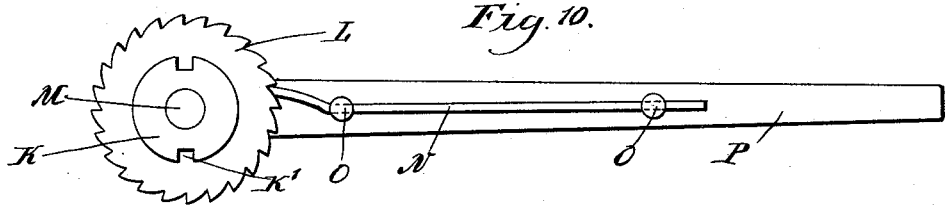
Figure 11:
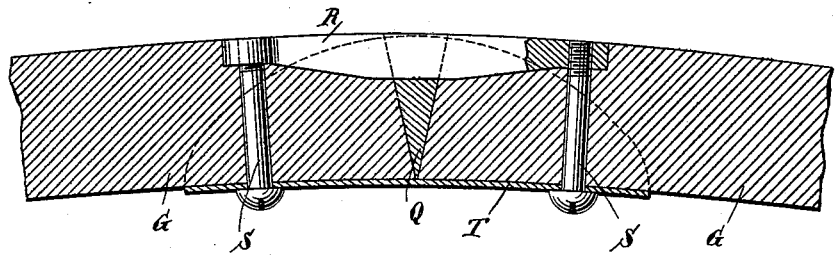
Figure 12:
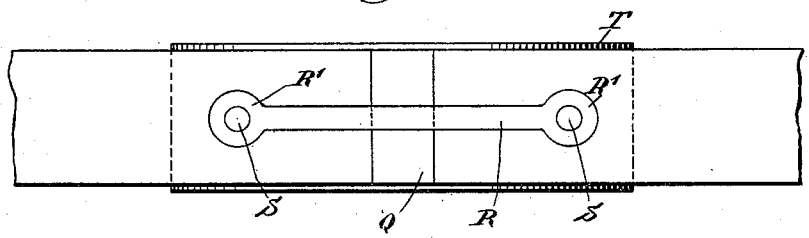
Figure 13:
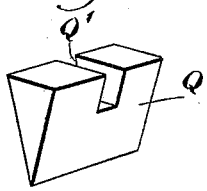

Figure 1 is a side elevation of my improved wheel. Fig. 2 is a cross-section thereof. Fig. 3 is a broken side elevation showing the connection of the spokes with the hub. Figs. 4, 5, and 6 are details showing various means of connecting the spokes, rim, and tire with each other. Fig. 7 is an enlarged partly-sectional view showing the employment of a tubular metal spoke. Fig. 8 is a sectional view showing the connection of the axle and axle-box with the hub and spokes. Figs. 9 and 10 are a plan and side elevation, respectively, of the wrench employed in tightening the tire. Figs. 11 and 12 are a longitudinal section and a plan, respectively, showing the particular rim-joint I prefer to employ; and Fig. 13 is a perspective view of a wedge used at such joint.

In carrying out my invention I mount the axle A in the axle-box B, fitted into the hub C. The axle-box fits at one end tightly into said hub, and at the other end it is held in position by means of an interposed ring or washer D. The axle-box B and hub C may be made of one piece, if desired. The hub C is provided with screw-threads of opposite directions, said threads being adapted to receive the collars E and E', respectively, to which the spokes F are secured. These spokes converge from the collars E E' toward the rim G. They are secured to the collars in any suitable manner—for instance, as shown in Fig. 3, by means of angular tenons F' engaging sockets H, secured to the collar E, or, as shown in Fig. 7, when a hollow metal spoke $F^2$ is employed said spoke may be screw-threaded to connect with a projection $E^2$ on the collar E.

The connection with the rim is made in various ways, according to the shape of the rim. With a tubular spoke, such as shown in Fig. 7, I prefer to use a screw-plug I, having a head which bears against the outside of the rim. When a concaved metallic rim is used, as in Figs. 1, 2, 4, and 6, I provide said rim with sockets G', into which the spokes are fitted by tenons, this construction being well known. When the rim $G^2$ is made of wood, as in Fig. 5, the sockets $G^3$ for the reception of the spokes are made in one piece with said rim.

The tire J is of any usual construction and is grooved to receive the rim, two grooves being provided when a concaved metal rim is used, (see Figs. 4 and 6,) while a single wide groove is used for a wood rim, as shown in Fig. 5. It will be understood that the tire is put on cold, and then the rim is expanded by turning the hub C, and thus moving the collars E E' toward each other. In order to turn the hub, I provide the same at its outer end with interior projections $E^3$. These are adapted to be engaged in notches K' of a disk K, made integral or rigid with a ratchet-wheel L of the wrench, as shown in Figs. 9 and 10. The ratchet-wheel is pivoted at M and is engaged by a spring N, held by clips O upon the handle P of the wrench. As the wheel cannot turn, owing to the weight supported thereby, the hub C will be turned by the wrench until the tire is quite tight, and then the spring N will give sufficiently to slip over the ratchet, thus allowing the ratchet to remain stationary.

In order to prevent the collars E E' from changing their position relatively to the hub while the wheel is turning, I may provide the hub with longitudinal grooves C', (see Fig. 3,) adapted to be engaged by a screw $Q^2$ upon the collar E. The wheel and hub are thus locked to rotate together.

Figs. 11, 12, and 13 show a rim-joint which I prefer to use in my vehicle-wheel, although, of course, other joints may be employed. The ends of the rim G are beveled, forming a space to receive a wedge Q. On its outer face the rim has a peripheral groove at the joint and the wedge has a transverse groove Q', adapted to register with the groove on the rim ends. These registering grooves receive a bar R, having an eye R' at each end, the eyes being threaded to receive screws S, passing through the rim and through a shoe T, extending on the inner surface of the rim and also along the sides thereof to engage the wedge Q.

Having thus described my invention, I claim as new and desire to secure by Letters Patent—

1. The combination of the rim having beveled ends and provided with a peripheral groove on its outer face at each end, the wedge located between said ends and provided on its outer or base end with a transverse groove registering with the grooves on the rim, a bar located in the said registering grooves and having a threaded eye at each end, a shoe engaging the inner surface of the rim and the sides thereof at the joint, and screws passing through the shoe and rim and engaging the threaded eyes of the bar, substantially as described.

2. A wheel comprising a cylindrical hollow hub, an axle-box fitted at one end tightly in the said hub, an interposed ring or washer at the other end of the axle-box, the outer end of the said hub being provided on its inner face with inwardly-projecting lugs, collars movable longitudinally of said hub, spokes converging outwardly from said collars and a rim secured to the outer end of the spokes, substantially as described.

JOSEPH BLAIS.

Witnesses:
 F. J. SOUTHWOOD,
 ALF. TESTER.